Nov. 7, 1944.   M. H. THURMOND   2,362,325
INDICATOR FOR TERRACING APPARATUS
Filed Feb. 7, 1944
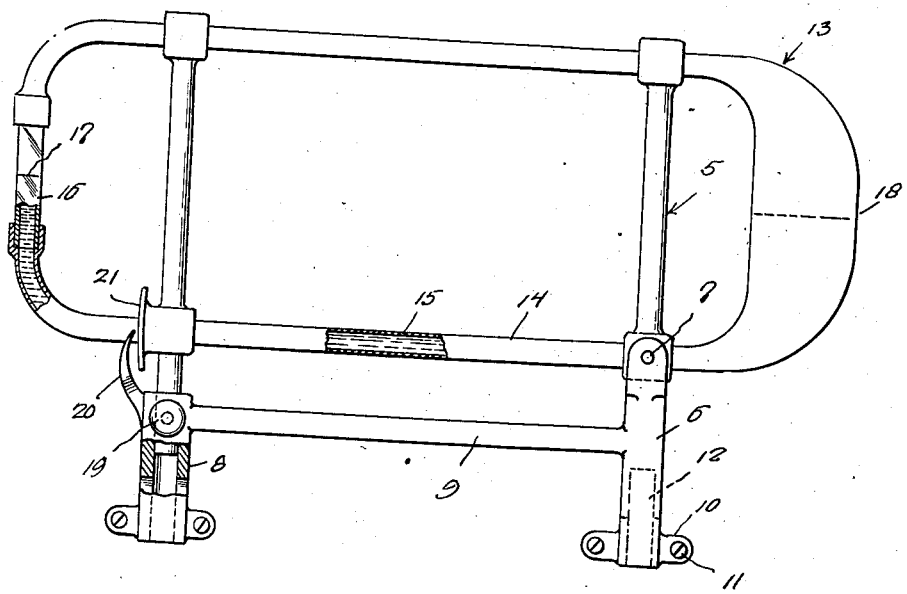
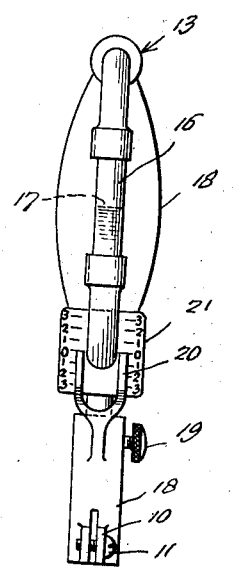
Inventor
Modie H. Thurmond,
Attorneys Patented Nov. 7, 1944

2,362,325

UNITED STATES PATENT OFFICE 2,362,325

INDICATOR FOR TERRACING APPARATUS

Modie H. Thurmond, Cuba, Mo.

Application February 7, 1944, Serial No. 521,416

4 Claims. (Cl. 33—209)

This invention relates to an indicator for assisting the operator of a power driven terrace forming implement in steering the latter to form soil erosion preventing terraces on a hillside with a desired slope endwise thereto.

The primary object of the invention is the provision of an indicator of the stated character which will be extremely easy to install and which will be sufficiently accurate to permit terracing of land as specified for the prevention of soil erosion without previously making surveys or the use of surveying instruments.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation, partly in section, illustrating an indicator constructed in accordance with my invention.

Figure 2 is an end elevation illustrating the device.

Referring in detail to the drawing, the numeral 5 indicates spaced vertically arranged posts one of which is slightly longer than the other. The shortest post is pivotally connected to a standard 6, as at 7, while the longest post is freely received within a standard 8. The standards 6 and 8 are rigidly connected by a brace 9. The standards are bifurcated and socketed, as at 12, and provided with apertured ears 10 having fasteners 11 for contacting the standards in studs (not shown) provided on the terracing implement for the mounting of the device thereon.

A liquid level device 13 is rigidly mounted on the posts 5 and is in the form of an elongated looped tubular member 14 adapted to be substantially half filled with a liquid 15. One of the end portions of the tubular member 14 is in the form of a sight tube 16 having a marking 17 thereon. The other end portion of the tubular member 14 is of an increased diameter having to provide a reservoir 18 for a greater amount of liquid at the latter named end portion of the tubular member than at the sight tube 16 for the purpose of causing the liquid to be more sensitive in flow when an inclination is had to the tubular member 14. The enlarged end portion forming the reservoir 18 may have a diameter approximately ten times the diameter of the sight tube. However, the size of the reservoir may be made smaller or larger if desired.

The tubular member 14 includes superimposed upper and lower runs and the lower run as well as approximately one half of the end portions of the tubular member is filled with the liquid 15. This liquid may be of any desired kind preferably of a nature that will be non-freezing and will readily flow in different temperatures.

The standard 8 is equipped with a set screw 19 which may be turned against the post received by said standard which construction provides means to permit the tubular member to be adjusted by being swung on the pivot 7 and then secured in any of its adjusted positions. A forked type pointer 20 is formed on the standard and operates in conjunction with a scale plate 21 carried by one of the posts. The scale plate and pointer facilitate accurate adjustment of the tubular member 14 on its support. The scale on the scale plate is clearly shown in Figure 2 and it is to be noted that the graduations extend from zero in opposite directions toward the ends of the scale plate.

This device may be employed on any type of manually steered implement or machine used in the terracing of hillsides or on a tractor employed in the draft of terrace forming machines. The device is installed so that the tubular member 14 is arranged longitudinally of the implement or machine with the sight tube 16 in view of the operator. The device may be employed in forming terraces with the implement traveling on either a descent or an ascent. The adjustment of the tubular member 14 on its pivot 7 permits this to be accomplished. As for example, the operator wishing to terrace a hillside with the terrace having approximately a two percent slope thereto and with the machine or implement progressing on the hillside with an ascent, the member 14 is moved on the pivot 7 until the pointer is opposite the two on the scale plate 21 below the zero marking and the member 14 is then locked in this position by the set screw 19. The operator then steers the machine on the hillside with the machine ascending only to the extent that the liquid 15 coincides with the marking 17 of the sight tube which will be that the machine will be ascending on approximately a two percent grade, so that the terrace when completed by the machine will have a desired slope from end to end thereof which is approximately a two percent slope sufficient for proper drainage with the danger of soil erosion eliminated.

The machine may be operated on a descent in a like manner except that the device is adjusted on its pivot until the pointer coincides with the character 2 on the scale plate above the zero marking. Other slopes to the terraces may be had by adjusting the device so that the pointer coincides with the character on the scale plate selected and which is in accordance with the degree of slope desired for the terrace. The operator then steers the machine as heretofore described, keeping the machine headed on the hillside so that the liquid coincides with the marking on the sight tube.

While I have shown and described the preferred embodiment of my invention, it will be understood that minor changes in construction, combination and arrangement of parts may be made without departing from the spirit and scope of the invention as claimed.

Having thus described my invention, what I claim is:

1. In an indicator for machines employed in terracing hillsides, vertically arranged standards mounted on the machine, a post pivoted to one of said standards, a second post adjustably connected to the other standard, and a liquid level medium carried by said posts.

2. In an indicator for machines employed in terracing hillsides, vertically arranged standards mounted on the machine, a post pivoted to one of said standards, a second post adjustably connected to the other standard, and a loop shaped tubular member filled approximately one-half with liquid carried by said posts and including a sight tube provided with a marking.

3. In an indicator for machines employed in terracing hillsides, vertically arranged standards mounted on the machine, a post pivoted to one of said standards, a second post adjustably connected to the other standard, a loop shaped tubular member filled approximately one-half with liquid carried by said posts and including a sight tube provided with a marking, said tubular member opposite the sight tube having a diameter larger than the diameter of the sight tube.

4. In an indicator for machines employed in terracing hillsides, vertically arranged standards mounted on the machine, a post pivoted to one of said standards, a second post adjustably connected to the other standard, a loop shaped tubular member filled approximately one-half with liquid carried by said posts and including a sight tube provided with a marking, said tubular member opposite the sight tube having a diameter larger than the diameter of the sight tube, a brace rigidly connecting the standards, a scale plate on the tubular member adjacent the sight tube, and a pointer carried by one of the standards and cooperating with the scale plate in making adjustments to the tubular member.

MODIE H. THURMOND.